United States Patent [19]

Elia

[11] Patent Number: 4,977,216
[45] Date of Patent: Dec. 11, 1990

[54] TOUGHENED NYLONS CHARACTERIZED BY LOW MOLD DEPOSIT

[75] Inventor: Andri E. Elia, Vienna, W. Va.

[73] Assignee: E. I. Du Pont de Nemours and Company, Wilmington, Del.

[21] Appl. No.: 506,490

[22] Filed: Apr. 5, 1990

Related U.S. Application Data

[63] Continuation of Ser. No. 237,169, Aug. 29, 1988, abandoned.

[51] Int. Cl.$^5$ ............................................. C08L 77/00
[52] U.S. Cl. ..................................... 525/183; 525/919
[58] Field of Search ................................ 525/183, 919

[56] References Cited

U.S. PATENT DOCUMENTS

| | | | |
|---|---|---|---|
| 3,845,163 | 10/1974 | Murch | 260/857 L |
| 4,174,358 | 11/1979 | Epstein . | |
| 4,246,371 | 1/1981 | Meyer et al. | 525/919 |
| 4,346,194 | 8/1982 | Roura | 525/66 |
| 4,690,981 | 9/1987 | Statz | 525/329.6 |
| 4,801,649 | 1/1989 | Statz | 525/183 |

Primary Examiner—Ana L. Carrillo

[57] ABSTRACT

Thermoplastic polyamide compositions consisting essentially of 75-90 weight percent nylon 6, nylon 66 or nylon 66/6 blends (nylon 6≦50%) with 10-25 weight percent ethylene ionomer containing softening comonomer are characterized by a unique combination of high stiffness and toughness, and freedom from mold deposit.

11 Claims, No Drawings

TOUGHENED NYLONS CHARACTERIZED BY LOW MOLD DEPOSIT

This application is a continuation of application Ser. No. 07/237,169 filed Aug. 29, 1988, now abandoned.

TECHNICAL FIELD

This invention relates to certain thermoplastic polyamide compositions which possess a unique combination of properties, namely they can be toughened at relatively low levels of toughener, achieving high toughness with high stiffness, and they have "freedom from mold deposit". "Freedom from mold deposit" is defined as significantly less mold deposit than what is generally observed in commercially available thermoplastic polyamide compositions toughened with ionomer. This "freedom from mold deposit" represents the level at which significantly less frequent cleaning of the molds and interruption of the molding process is required than what is now common with commercially available ionomer toughened thermoplastic polyamide compositions. The thermoplastic polyamide compositions of this invention contain thermoplastic polyamide(s) toughened with certain ionomers of ethylene and an unsaturated carboxylic acid. These compositions give toughness levels as measured by notched Izod from about 140 to 1400 J/m and stiffness levels as measured by flexural modulus from about 1800 to 3000 MPa. The toughened compositions are useful in making molded and extruded parts. Such parts possess greater ductility, less reduction in toughness from scratches and molded-in notches, and reduced susceptibility to catastrophic failure when compared to known melt fabricated materials. Further, freedom from mold deposit results in parts with better surface appearance.

BACKGROUND ART

U.S. Pat. No. 4,690,981, granted Sept. 1, 1987 to Statz, discloses ionomers of ethylene, unsaturated carboxylic acid and a softening comonomer that can be blended with nylon to produce a toughened thermoplastic. Statz's invention differs from the present invention in the amount of ionomer used. Statz discloses levels of ionomer greater than or equal to 30 weight percent; the composition of the present invention discloses ionomer from 10-25 weight percent. No freedom from mold deposit is disclosed in Statz.

U.S. Pat. No. 4,174,358, granted Nov. 13, 1979 to Epstein, discloses a toughened multi-phase thermoplastic composition containing 60-99 weight percent of a polyamide matrix resin and 1-40 weight percent of a toughener. Among the tougheners disclosed in Epstein are several ionomers. The ionomers specifcally disclosed and exemplified in Epstein are chemically different from those disclosed in the present invention. Further, the compositions of the present invention are superior to the ionomer toughened compositions exemplified by Epstein; the compositions of the present invention have freedom from mold deposit and a better combination of toughness and stiffness.

U.S. Pat. No. 4,346,194, granted Aug. 24, 1982 to Roura, discloses a polyamide molding material having good impact strength at low temperature and comprising a 60-90 weight percent blend of nylon 66 (20-80 weight percent); nylon 6 (80-20 weight percent); and a toughening copolymer (3-40 weight percent). Roura shows that blends of nylon 66/6 have synergism with respect to toughness; however, the toughening copolymer is completely different than that used in the present invention. Furthermore, Roura is only concerned with good impact strength at low temperature, and makes no reference to flexural modulus and percent elongation.

U.S. Pat. No. 3,845,163, granted Oct. 29, 1974 to Murch, discloses from 60-85 weight percent of polyamide and from 15-40 weight percent of an ionomer, the composition having improved weld-line toughness. The compositions of the present invention contain a copolymer of three or more substituents, while no disclosure of such an ionic copolymer is made in the Murch reference. No mention is made of freedom from mold deposit in Murch.

DISCLOSURE OF THE INVENTION

This invention relates to certain thermoplastic polyamide compositions which possess a unique combination of properties, namely they can be toughened at relatively low levels of toughener, achieving high toughness with high stiffness, and they have "freedom from mold deposit". "Freedom from mold deposit" is defined as significantly less mold deposit than what is generally observed in commercially available thermoplastic polyamide compositions toughened with ionomer. This freedom from mold deposit represents the level at which significantly less frequent cleaning of the molds and interruption of the molding process is required than what is now common with commercially available ionomer toughened thermoplastic polyamide compositions.

The toughened compositions are useful in making molded and extruded parts. Such parts possess greater ductility, less reduction in toughness from scratches and molded-in notches and reduced susceptibility to catastrophic failure when compared to known melt fabricated materials. Also, freedom from mold deposit results in parts with better surface appearance.

More specifically, the compositions of the present invention comprise thermoplastic polyamide compositions formed by melt blending under high shear the following components:

(a) 75-90 weight percent of a thermoplastic polyamide selected from nylon 66, nylon 6 and nylon 66/6 blends where the blends contain not more than 50 weight percent nylon 6, and where the polyamide has a number average molecular weight of at least 5,000; and (b) 10-25 weight percent of an ionomer of ethylene, E/X/Y, where E is ethylene from 45-94 weight percent, X is from 1-20 weight percent of an unsaturated carboxylic acid, wherein the unsaturated carboxylic acid is selected from the group consisting of acrylic acid, methacrylic acid, maleic acid, fumaric acid, itaconic acid, and half esters of maleic, fumaric and itaconic acid, and Y is from 5-35 weight percent of at least one softening comonomer, wherein the softening comonomer is of the formula

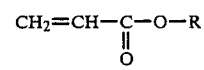

where R is selected from the group consisting of n-propyl, n-butyl, n-pentyl, n-hexyl, n-heptyl, n-octyl, n-nonyl, 2-ethylhexyl, 2-methoxyethyl, 2-ethoxyethyl, 3-methoxypropyl, 3-ethoxypropyl and 3-methoxybutyl, and further wherein the copolymer has from about 3 to about 90 percent of the carboxylic acid groups neutralized with metal ions selected from groups Ia,IIa, IIb, IIIa, IVa, VIb and VIII of the Periodic Table of the Elements Preferred compositions of the present invention comprise thermoplastic polyamide compositions formed by melt blending under high shear:

(a) 80-85 weight percent of a thermoplastic polyamide selected from nylon 66 or nylon 66/6 blends where the blends contain not more than 40 percent nylon 6, and where the polyamide has a number average molecular weight of at least 5,000.

(b) 15-20 weight percent of an ionomer of ethylene, E/X/Y, where E is ethylene from 55-83 weight percent, X is from 7-15 weight percent of unsaturated carboxylic acid, wherein the unsaturated carboxylic acid is selected from the group consisting of acrylic acid and methacrylic acid, and Y is from 10-30 weight percent of at least one softening comonomer, wherein the softening comonomer is of the formula

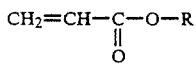

where R is selected from the group consisting of n-butyl, 2-ethylhexyl and 2-methoxyethyl, and further wherein the copolymer has from about 35 to about 75 percent of the carboxylic acid groups neutralized with metal ions selected from the group consisting of sodium, potassium, zinc, calcium and magnesium.

Most preferred compositions of the present invention comprise thermoplastic polyamide compositions formed by melt blending under high shear:

(a) about 85 weight percent of a thermoplastic polyamide resin being a nylon 66/6 blend with 24-40 weight percent nylon 6, and where the polyamide has a number average molecular weight of at least 5,000.

(b) about 15 weight percent of an ionomer of ethylene, E/X/Y, where E is ethylene from 61-77 weight percent, X is from 8-12 weight percent of methacrylic acid, and Y is from 15-27 weight percent of n-butyl acrylate, and further wherein the copolymer has about 70 percent of the carboxylic acid groups neutralized with zinc ion.

The components described above are melt blended with each other under high shear. The various ingredients may first be combined with one another in what is commonly referred to as a "salt and pepper" blend, i.e., a pellet blend, of each of the ingredients, or they may be combined with one another via simultaneous or separate metering of the various components, or they may be divided and blended in one or more passes into one or more sections of mixing equipment such as an extruder, Banbury, Buess Kneader, Farrell Continuous Mixer or other mixing equipment.

Polyamides suitable for use in the current invention include those described in U.S. Pat. No. 4,174,358 and 4,346,194.

The ionomers of ethylene of the present invention can be prepared by direct or graft copolymerization. The direct copolymerization process comprises polymerizing ethylene, unsaturated carboxylic acid and a softening comonomer in the presence of free radical polymerization initiator at elevated temperatures of from about 100° to about 200° C. or from about 130° to about 145° C. at high pressures, e.g., at least about 140 MPa (20,000 psi) preferably from about 140 MPa (20,000 psi) to about 350 MPa (50,000 psi) followed by neutralization of the carboxylic acid groups of the resultant direct copolymer with metal ions. A suitable polymerization process is discussed in detail in U.S. Pat. No. 3,264,272 and 4,690,981, the disclosure of which patent is hereby incorporated by reference.

The graft copolymerization process can be carried out by polymerizing ethylene and copolymer in the presence of free radical polymerization initiator at elevated temperatures of from about 100° to about 200° C., preferably from about 140° C. to about 160° C. and from about 130° to about 145° C., at high pressures, e.g., at least about 140 MPa (20,000 psi), preferably from about 140 MPa (20,000 psi) to about 350 MPa (50,000 psi), and grafting unsaturated carboxylic acid onto the ethylene/-comonomer polymer backbone followed by neutralization of the carboxylic acid groups of the resultant graft copolymer with metal ions.

The ionomers of ethylene include ethylene/acrylic acid/n-butyl acrylate, ethylene/methacrylic acid/n-butyl acrylate, ethylene/methacrylic acid/2-ethoxyethyl acrylate, ethylene/methacrylic acid/n-propyl acrylate, ethylene/acrylic acid/2-ethoxyethyl acrylate, ethylene/acrylcc acid/n-octyl acrylate, ethylene/methacrylic acid/n-pentyl acrylate, ethylene/acrylic acid/n-pentyl acrylate, ethylene/acrylic acid/2-ethylhexyl acrylate, ethylene/acrylic acid/n-propyl acrylate, ethylene/acrylic acid/n-heptyl acrylate, ethylene/acrylic acid/2-methoxyethyl acrylate, ethylene/acrylic acid/3-methoxypropyl acrylate and ethylene/acrylic acid/3-ethoxypropyl acrylate.

Preferred ionomers of ethylene for use in the compositions of the present invention include ethylene/methacrylic acid/n-butyl acrylate, ethylene/acrylic acid/n-butyl acrylate, ethylene/acrylic acid/2-methoxyethyl acrylate and ethylene/acrylic acid/ethylhexyl acrylate. The most preferred ionomer of ethylene for use in the compositions of the present invention is ethylene/methacrylic acid/n-butyl acrylate.

In addition to thermoplastic polyamide resin and ionomer of ethylene discussed above, the thermoplastic polyamide compositions of the present invention may include other ingredients as are used in the conventional compounding of polyamide and/or ionomers of ethylene, provided such additional ingredients are no more by weight per 100 parts of the total of thermoplastic polyamide plus ionomer of ethylene. Examples of such other ingredients include carbon black, glass fibers, graphite fibers, Kevlar ® aramid fibers, glass spheres, plasticizers, lubricants, silica, titanium dioxide, pigments, clay, mica and other mineral fillers, flame retardants, antioxidants, ultraviolet stabilizers, heat stabilizers, processing aids, adhesives and tackifiers.

The following is a detailed description of examples of the composition of the present invention and control examples. The compositions of the present invention and the control compositions were prepared on a ten barrel 53 mm Werner & Pfleiderer twin screw extruder at 90 kg/hr feed rate and 250 rpm screw speed. All the ingredients for each composition were preblended and fed into barrel 1 with a screw feeder. A vacuum was applied at barrel 9. After exiting through a 4-hole die, the strands were quenched in an ambient water trough with circulating water. The strands were subsequently pelletized at 100°-110° C. cut temperature and allowed to cool under nitrogen sparge.

The representative extrusion condition for samples 1-16 is:

| Barrel | 1 | 2 | 3 | 4 | 5 | 6 | 7 | 8 | 9 | 10 |
|---|---|---|---|---|---|---|---|---|---|---|
| Temp. Setting °C. | no heat | 230 | 265 | 280 | 280 | 280 | 280 | 280 | 280 | 280 |

Die Temperature: 280° C.
Melt Temperature: 290-305° C.

The representative extrusion condition for samples 17-19 is:

| Barrel | 1 | 2 | 3 | 4 | 5 | 6 | 7 | 8 | 9 | 10 |
|---|---|---|---|---|---|---|---|---|---|---|
| Temp. Setting °C. | no heat | 230 | 265 | 265 | 265 | 265 | 265 | 265 | 265 | 270 |

Die Temperature: 275° C.
Melt Temperature: 285-305° C.

The extruded material was molded into test bars on a 44.45 mm diameter injection molding machine, at 142 g/shot and 3.175 mm thick flex bars and tensile bars were molded, (ASTM D-647 127×12.7×3.175 mm flex bars, and ASTM D-638 specimen Type I, 3.175 mm thick tensile bars).

The temperatures of the molding machine extruder were set at 282° C. and the melt temperature ranged from 271°-299° C. The mold temperature was set at 66° C. and the clamp force was 1600 kN. The overall cycle time was 45 seconds (clamp closed time was 40 seconds and the mold open time was 5 seconds). The injection hold time was 20 seconds.

In the following examples, notched Izod (ASTM D-256, method A), flexural modulus (ASTM D-790M) and tensile/elongation properties (ASTM D-638) were tested on the molded bars which are described immediately above.

The mold deposit study of the compositions of the present invention was done on a 200T Cincinnati Milacron injection molding machine having a clamp force of 1779 kN, and 236 cubic cm. maximum shot size, and a hopper dryer to assure that the compositions were dry. The mold was a one-cavity disk having a diameter of 101.6 mm and a wall thickness of 1.58 mm. The molding conditions were:

Melt temperature: 293° C. except for sample 14 which was 252° C. (measured by a needle pyrometer)
Mold temperature: 82° C.
Screw Speed: 50 rpm
Pad or "cushion" 6.35 mm
OAC (overall cycle time): 33 sec.
RAM in Motion: 1 sec.

The pad or "cushion" referred to above is a small amount of melt remaining in front of the nozzle tip for packing part purposes and the RAM in Motion is the time to produce the part.

The mold deposit study results were rated on photographs of the mold after 800 shots of each resin were run except for samples 4, 5 and 14 where 1000 shots were run (see Table II for details). The 800 shots represent a standard number of shots used in testing mold deposit for commercial applications when a customer has a problem or question.

The mold deposit rating scale ranges from 0-10 (see below) and acceptable levels of mold deposit were set at one-third (3.33) or less because samples that fell at 3.33 or below required significantly less frequent cleaning of the molds than what is now common with commercially available ionomer toughened thermoplastic polyamid compositions.

A description of various levels is as follows:

0 = no mold deposit
0.2 = very slight film
0.5 = very slight gate smear
1.0 = slight film, slight gate smear
1.6 = light film, gate smear
2.0 = film, gate smear
3.3 = slight mold deposit
5.0 = mold deposit, covering less than ½ of the mold surface area
8.0 = heavy mold deposit
9.0 = severe mold deposit
10.0 = very severe mold deposit The terms above being defined as followed:
film—very thin covering of the mold
gate smear—accumulation of degraded material at the injection site
mold deposit—heavy accumulation of degraded material all over the mold In the following examples, all percentages are given by weight and all values originally obtained in British units have been converted to S.I. units and rounded, where appropriate; and finally, blanks or dashes in tables denote either the absence of a particular component or that a particular test was not In the following examples, two different polyamides were used:

(a) "polyamide A" was polyhexamethyleneadipamide, nylon 66; and
(b) "polyamide B" was polycaprolactam, nylon 6.

In the following examples, three different ionomers of ethylene were used (two being controls):

(a) "ionomer A" was poly(ethylene/n-butyl acrylate/methacrylic acid) (E/n-BA/MAA) at approximate degree of neutralization of 70 percent with zinc ions. The ionomer contains 67 weight percent ethylene, 24 percent n-butyl acrylate and 9.0 weight percent methacrylic acid;
(b) "ionomer B", which was used as a control, was poly(ethylene/methacrylic acid) (E/MAA) at approximate degree of neutralization of 71 percent with zinc ions. The ionomer contains 90 weight percent ethylene and 10 weight percent methacrylic acid; and
(c) "ionomer C", which was used as a control, was poly(ethylene/iso-butyl acrylate/methacrylic acid) (E/i-BA/MAA). The ionomer contains 80 weight percent ethylene, 10 weight percent i-butyl acrylate and 10 weight percent methacrylic acid.

The compositions of the samples are described in Table I based on the above defined components.

TABLE I

| Sample | Polyamide Resin | | Ionomer of Ethylene | | |
|---|---|---|---|---|---|
| | A | B | A | B | C |
| 1 | 95 | — | 5 | — | — |
| 2 | 90 | — | 10 | — | — |
| 3 | 85 | — | 15 | — | — |
| 4 | 80 | — | 20 | — | — |
| 5 | 75 | — | 25 | — | — |
| 6 | 75 | 10 | 15 | — | — |
| 7 | 65 | 20 | 15 | — | — |
| 8 | 55 | 30 | 15 | — | — |
| 9[1] | 55 | 28 | 15 | — | — |
| 10 | 42.5 | 42.5 | 15 | — | — |
| 11 | 30 | 55 | 15 | — | — |
| 12 | 20 | 65 | 15 | — | — |
| 13 | 10 | 75 | 15 | — | — |
| 14 | — | 85 | 15 | — | — |
| 15 | 85 | — | — | 15 | — |
| 16 | 55 | — | — | 30 | — |
| 17 | 55 | 27 | — | — | 18 |
| 18 | 55 | 27 | 18 | — | — |
| 19 | 55 | 27 | — | 18 | — |
| 20 | 80 | — | — | 20 | — |

[1]contains 2% of an additive consisting of 33% carbon black and 67% polyethylene.

EXAMPLE 1

Table II shows compositions containing nylon 66 as the thermoplastic polyamide with varying amounts of the ionomer of ethylene, as shown in Table I. For samples 2 and 3, it can be seen from the notched Izod at 23° C. and the flexural modulus that the composition is toughened yet demonstrates excellent stiffness. Samples 2 and 3 demonstrate compositions containing ionomer with n-BA are toughened at relatively low levels of the ionomer, 10% and 15%, respectively. Sample 2, at 10% ionomer (with n-BA) has equivalent toughness with control sample 15, which contains 15% ionomer without n-BA; and sample 2 is 9% stiffer than sample 15. At the ionomer level of 15%, sample 3, which contains the n-BA ionomer, achieves nearly twice the toughness of sample 15, which contains the ionomer without n-BA and sample 3 is only 5% less stiff than sample 15. Furthermore, sample 3 which has 15% of the n-BA ionomer, has equivalent toughness with control sample 2, which contains 20% of the ionomer without n-BA; sample 3 is 8% stiffer than sample 20. At 20% ionomer, compositions containing the n-BA ionomer of ethylene are dramatically tougher than compositions containing ionomer of ethylene without n-BA at the same level of ionomer, yet are only slightly less stiff.

Samples 4 and 5 demonstrate excellent low temperature toughness and good stiffness with levels of the n-BA ionomer of ethylene at 20 and 25 weight percent. In comparing sample 4 to control sample 20, sample 4, which contains 20% of the n-BA ionomer of ethylene, is dramatically tougher at room temperature (4.4 times or 338%) than sample 20, which contains 20% of the ionomer of ethylene without n-BA. Sample 4 is slightly less stiff (6%) than sample 20. Similarly, at 25% of the n-BA ionomer of ethylene, sample 5 has an excellent combination of toughness and stiffness, increasing significantly in toughness from sample 4, while decreasing less in stiffness, than would have been predicted b the relative stiffness of the control samples 15 and 20 (ionomer without n-BA).

Samples 1-5 show slight or less mold deposit. By comparison, control sample 15, which contains 15% ionomer of ethylene without n-BA, suffers from heavy mold deposit. The above demonstrates the criticality of using ethylene ionomer containing softening comonomer, e.g., n-BA to achieve freedom from mold deposit.

TABLE II

| Sample | Notched Izod (J/m) | | Flex Modulus MPa | % Elong | Tensile Str. Brk (MPa) | Mold Dep. |
|---|---|---|---|---|---|---|
| | 23° C. | 0° C. | | | | |
| 1 | 71.52 | — | 2924 | 56 | 48 | 0.2 |
| 2 | 140.4 | — | 2648 | 45 | 52 | 0.5 |
| 3 | 241.3 | — | 2303 | 63 | 50 | 1.0 |
| 4 | 1121 | 214.6 | 2014 | 61 | 49 | 1.6 |
| 5 | 1345 | 416.3 | 1814 | 50 | 46 | 3.3 |
| 15* | 131.3 | — | 2428 | 55 | 49 | 8.0 |
| 20* | 256.2 | — | 2138 | 68 | 46 | 10.0 |

*Control

EXAMPLE 2

Table III shows compositions that contain nylon 66, nylon 6 and nylon 66/6 blends with an ionomer of ethylene. Blends with not more than 50 weight percent nylon 6 (samples 3 and 6-10) demonstrate a good combination of toughness and good stiffness, and have very low mold deposit levels, ranging from slight films to gate smears. Blends containing greater than 50 weight percent nylon 6 (samples 11-13) reveal mold deposit in a very significant amount, levels ranging from severe to very severe mold deposit, 9-10. Sample 14, containing all nylon 6 as thermoplastic polyamide resin, reveals a good combination of stiffness and toughness, and a very small mold deposit level, 2.0, provided that the melt temperature in molding is lowered to 252° C. rather than 293.C due to the lower melting point of nylon 6. Sample 15 and 16 show that when no n-BA is present in the ionomer of ethylene mold deposit levels are very significant, 8.0 and 10.0, respectively.

Sample 9, which has a very similar composition to sample 8, demonstrates carbon black can be added to the components of the present invention with retention of the good combination of toughness and stiffness, and the freedom from mold deposit.

TABLE III

| Sample | Notched Izod (J/m) | | Flex Modulus MPa | % Elong | Tensile Str. Brk (MPa) | Mold Dep. |
|---|---|---|---|---|---|---|
| | 23° C. | 0° C. | | | | |
| 3 | 241.2 | — | 2303 | 63 | 50 | 1.0 |
| 6 | 311.7 | — | 2145 | 72 | 50 | 1.6 |
| 7 | 1094 | 161.7 | 2021 | 103 | 48 | 1.7 |
| 8 | 1100 | 126.5 | 1979 | 131 | 48 | 1.9 |
| 9 | 1220 | 175.6 | 1924 | 78 | 44 | 2.5 |
| 10 | 1185 | 148.4 | 1883 | 187 | 46 | 2.5 |
| 11* | 1137 | 134.5 | 1993 | 206 | 46 | 9.0 |
| 12* | 1084 | 119.0 | 1952 | 149 | 43 | 10.0 |
| 13* | 1164 | 134.5 | 1841 | 118 | 40 | 10.0 |
| 14 | 219.4 | — | 1828 | 184 | 40 | 2.0 |
| 15* | 131.3 | — | 2428 | 55 | 49 | 8.0 |
| 16* | 144.6 | — | 2090 | 205 | 50 | 10.0 |

*Control

EXAMPLE 3

Table IV shows compositions containing blends of nylon 66/6 with different ionomers of ethylene. Samples 17 and 19 show that a copolymer of ethylene without n-BA and a terpolymer containing i-BA instead of n-BA give dramatically lower toughness than the n-BA terpolymer of ethylene used in the present invention, sample 18. Also, sample 18 is stiffer than either sample 17 or 19. Sample 19 is the only sample in this set submitted for mold deposit study and reveals severe mold deposit formation, 10.0. From example 1, sample 18 is expected to have very low mold deposit.

TABLE IV

| Sample | Notched Izod (J/m) 23° C. | Notched Izod (J/m) 0° C. | Flex Modulus MPa | % Elong | Tensile Str. Brk (MPa) | Mold Dep. |
|---|---|---|---|---|---|---|
| 17 | 266.9 | — | 2000 | 146 | 47 | — |
| 18 | 1025 | 112.1 | 2200 | 131 | 48 | — |
| 19 | 213.5 | — | 2069 | 142 | 48 | 10.0 |

I claim:

1. A thermoplastic polyamide composition consisting essentially of
   (a) 75-90 weight percent of a thermoplastic polyamide selected from nylon 66, nylon 6 and nylon 66/6 blends where the blends contain not more than 50 weight percent nylon 6, and where the polyamide has a number average molecular weight of at least 5,000; and
   (b) 10-25 weight percent of an ionomer of ethylene, E/X/Y, where E is ethylene from 45-94 weight percent, X is from 1-20 weight percent of unsaturated carboxylic acid, wherein the unsaturated carboxylic acid is selected from the group consisting of acrylic acid, methacrylic acid, maleic acid, fumaric acid, itaconic acid, and half esters of maleic, fumaric and itaconic acid, and Y is from 5-35 weight percent of a softening comonomer, wherein the softening comonomer is of the formula

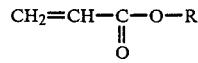

where R is selected from the group consisting of n-propyl, n-butyl, n-pentyl, n-hexyl, n-heptyl, n-octyl, n-nonyl, 2-ethylhexyl, 2-methoxyethyl, 2-ethoxyethyl, 3-methoxypropyl, 3-methoxybutyl and 3-ethoxypropyl, and further wherein the ionomer has from about 3 to about 90 percent of the carboxylic acid groups neutralized with metal ions selected from groups Ia, IIa, IIb, IIIa, IVa, VIb and VIII of the Periodic Table of the Elements.

2. The composition of claim 1 wherein component (a) is selected from nylon 66 and nylon 66/6 blends where the blend contains not more than 40 weight percent nylon 6.

3. The composition of claim 2 wherein component (a) is nylon 66/6 blend with about 24-40 weight percent nylon 6.

4. The composition of claim 1 wherein the thermoplastic polyamide is present in an amount of about 80-85 weight percent.

5. The composition of claim 4 wherein the thermoplastic polyamide is present in an amount of about 85 weight percent.

6. The composition of claim 1 wherein the ionomer of ethylene comprises from 55-83 weight percent ethylene, 7-15 weight percent of an unsaturated carboxylic acid selected from the group consisting of acrylic acid and methacrylic acid, and 10-30 weight percent of at least one softening comonomer, wherein the softening comonomer is of the formula

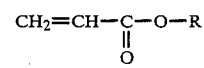

where R is selected from the group consisting of n-butyl, 2-ethylhexyl and 2-methoxyethyl, and further wherein the copolymer has from about 35 to about 75 percent of the carboxylic acid groups neutralized with metal ions selected from the group consisting of sodium, potassium, zinc, calcium and magnesium.

7. The composition of claim 6 wherein the ionomer of ethylene comprises from 61-77 weight percent ethylene, X is from 8-12 weight percent of methacrylic acid and Y is from 15-27 weight percent of n-butyl acrylate, and further wherein the copolymer has about 70 percent of the carboxylic acid groups neutralized with zinc ion.

8. The composition of claim 1 wherein the ionomer of ethylene is present in an amount of 15-20 weight percent.

9. The composition of claim 8 wherein the ionomer of ethylene is present in an amount of about 15 weight percent.

10. A method of preparing the composition of claim 1 by melt blending under high shear the thermoplastic polyamide resin and the ionomer of ethylene.

11. Shaped articles made from the composition of claim 1.

* * * * *